(No Model.)

W. R. EDDINGTON.
MOLE TRAP.

No. 331,483. Patented Dec. 1, 1885.

Attest:
Samuel H. Knight
F. A. Hopkins

Inventor:
William R. Eddington
By Knight Bro's
Atty's

UNITED STATES PATENT OFFICE.

WILLIAM RICHMOND EDDINGTON, OF WOODBURN, ILLINOIS.

MOLE-TRAP.

SPECIFICATION forming part of Letters Patent No. 331,483, dated December 1, 1885.

Application filed August 5, 1885. Serial No. 173,643. (No model.)

*To all whom it may concern:*

Be it known that I, WILLIAM R. EDDINGTON, of Woodburn, in the county of Macoupin and the State of Illinois, have invented a certain new and useful Improvement in Mole-Traps, of which the following is a full, clear, and exact description, reference being had to the accompanying drawings, forming part of this specification, and in which—

Figure 1:
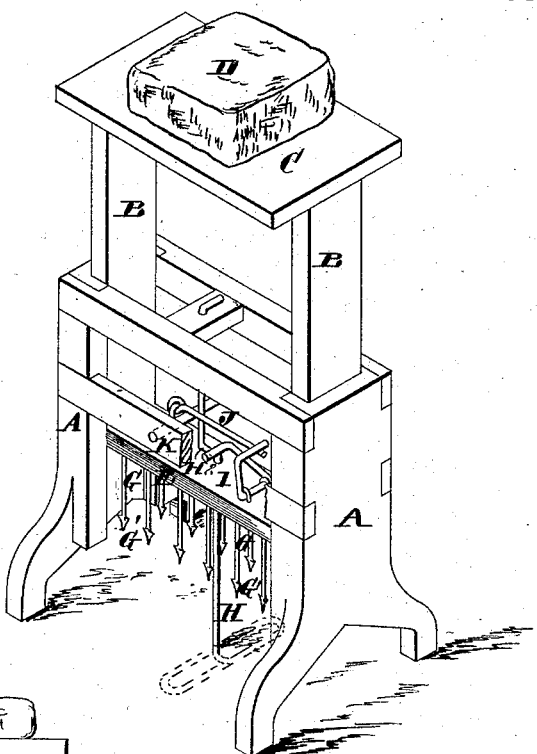
Figure 2:
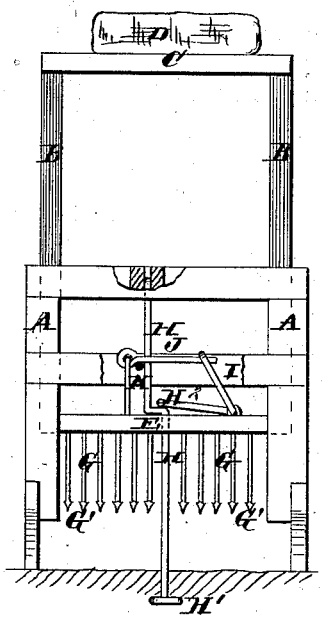
Figure 3:
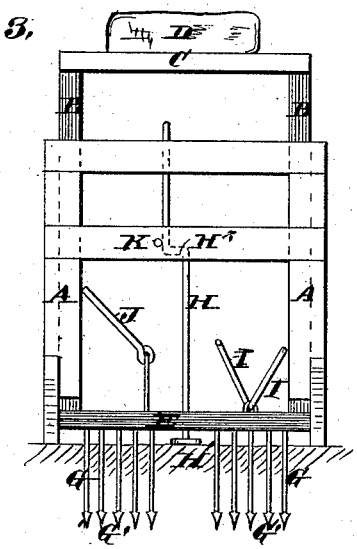

Figure 1 is a perspective view of the apparatus with the sash elevated. Fig. 2 is a side view of the sash elevated and parts broken away to show the operation of the tripping device, and Fig. 3 is a side view with the trip sprung and sash down.

My invention relates relates to certain improvements in those mole-traps which are provided with a drop-head having a lever hinged thereto, and held in inoperative position until released by the upward movement of a rod supported on a trigger lifted by the animal; and my invention consists in features of novelty hereinafter fully described, and pointed out in the claims.

Referring to the drawings, similar letters of reference in the various figures indicate like parts.

A represents the main frame of a mole-trap; B, the drop-sash, on top of which is a table, C, for holding a stone or weight, D, to accelerate the drop. To the sash is attached the head-block E, that is armed with drop-spikes G, which are provided with barbed points G'.

H is a vertical trigger-rod, whose loop H' descends into the mole-burrow. This rod has a crook at $H^2$, on which one angle, prong, or finger of the trip I rests, the other finger engaging the end of the lever J. The said lever is pivoted or hinged in a staple or loop secured to the head-block, and, passing over the fulcrum-bar K, is held down until it is engaged by the aforesaid finger or catch of the angle-trip when the trap is set, keeping the weighted sash or dead-fall from falling until the tripping device is sprung.

In operation the trap is placed astraddle of the mole-track, and the sash is raised until the head-block E strikes the cross or fulcrum bar K. The hinged or pivoted lever J is then passed over the fulcrum-bar, and is held by one finger of the angle-trip I, the other finger of which rests on the crook $H^2$ in the vertical trigger-rod H. At the lower extremity of said rod is the loop H', which, when the trap is set, descends about an inch below the top of the burrow. The mole can thus readily get its head below said loop, and it is evident when the animal raises its head the trigger-rod will be lifted, and the arms of the trip will be rotated as they are operated by the crook of the trigger-rod, the lever J will be disengaged from the finger that holds it, and the dead-fall will drop, killing the mole.

Dead-fall traps have heretofore been armed with smooth spikes; but it has been found that the moles frequently escaped from such, so I have provided a barbed spike that securely holds the mole as well as catches him; also, the loop of the trigger-rod is so located in the burrow that a mole cannot pass along the track without lifting the trigger-rod, and so precipitating the dead-fall under the operation of the tripping device.

I claim as my invention—

1. In a mole-trap, the combination, with a drop-head having a lever hinged thereto, of the trip I, having two arms, and also hinged to the head, and the trigger-rod having a crook, the lower arm of the trip extending to the crook and the upper arm of the trip engaging the lever, substantially as set forth.

2. The combination of the frame having a fulcrum-bar, K, a sash having a head, E, armed with spikes, lever J, secured to the head, trip-lever I, having arms and secured to the head, and a trigger-rod, H, formed with a crook, $H^2$, and loop H', the arms of the trip resting, respectively, on the crook and lever, substantially as set forth.

WILLIAM RICHMOND EDDINGTON.

In presence of—
W. H. GOODELL,
WILLIAM YARHAM.